(12) United States Patent
Tseng

(10) Patent No.: US 11,179,628 B2
(45) Date of Patent: Nov. 23, 2021

(54) REPLACEABLE CONTROL MODULE AND GAME CONTROLLER INCLUDING THE SAME

(71) Applicant: Cheng Uei Precision Industry Co., Ltd., New Taipei (TW)

(72) Inventor: Chi Ming Tseng, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 101 days.

(21) Appl. No.: 16/806,201

(22) Filed: Mar. 2, 2020

(65) Prior Publication Data
US 2021/0093949 A1    Apr. 1, 2021

(30) Foreign Application Priority Data

Sep. 26, 2019    (CN) .......................... 201921620680.1

(51) Int. Cl.
A63F 13/24        (2014.01)
(52) U.S. Cl.
CPC .................................... *A63F 13/24* (2014.09)
(58) Field of Classification Search
None
See application file for complete search history.

(56) References Cited

U.S. PATENT DOCUMENTS

| 5,615,083 | A | * | 3/1997 | Burnett | G05G 9/047 345/161 |
| 5,976,018 | A | * | 11/1999 | Druckman | A63F 13/08 463/47 |
| 2016/0149426 | A1 | * | 5/2016 | Hodges | H02J 50/80 320/108 |
| 2017/0282060 | A1 | * | 10/2017 | Wang | G06F 1/169 |
| 2017/0322585 | A1 | * | 11/2017 | Tomita | G01C 21/3664 |
| 2018/0185748 | A1 | * | 7/2018 | Biheller | A63F 13/23 |
| 2018/0185749 | A1 | * | 7/2018 | Kidakarn | A63F 13/22 |
| 2018/0264355 | A1 | * | 9/2018 | Burgess | A63F 13/20 |
| 2018/0333641 | A1 | * | 11/2018 | Strahle | A63F 13/24 |
| 2019/0015742 | A1 | * | 1/2019 | Strahle | A63F 13/23 |
| 2019/0041892 | A1 | * | 2/2019 | Wada | G05G 25/00 |

FOREIGN PATENT DOCUMENTS

CN    205886185 U  *  1/2017

* cited by examiner

*Primary Examiner* — James S. McClellan
*Assistant Examiner* — Peter J Iannuzzi
(74) *Attorney, Agent, or Firm* — Lin & Associates Intellectual Property, Inc.

(57) ABSTRACT

A replaceable control module includes a base and an operation module. The base includes an upper cover, at least one buckling portion, at least one first elastic element, a driving rotation handle, at least one second elastic element and a cam assembly. A top surface of the upper cover has an assembling groove and a perforation. The at least one buckling portion is disposed to the upper cover. The at least one first elastic element is connected between the upper cover and the at least one buckling portion. The driving rotation handle is disposed in the upper cover. The at least one second elastic element is connected between the upper cover and the driving rotation handle. The cam assembly is disposed between the at least one buckling portion and the driving rotation handle. The operation module is assembled in the assembling groove.

18 Claims, 18 Drawing Sheets

REPLACEABLE CONTROL MODULE AND GAME CONTROLLER INCLUDING THE SAME

CROSS-REFERENCE TO RELATED APPLICATION

The present application is based on, and claims priority from, China Patent Application No. 201921620680.1, filed Sep. 26, 2019, the disclosure of which is hereby incorporated by reference herein in its entirety.

BACKGROUND OF THE INVENTION

1. Field of the Invention

The present invention generally relates to a replaceable control module, and more particularly to a replaceable control module applied in a game controller, and the game controller including the replaceable control module.

2. The Related Art

Nowadays, a proportion of games is bigger and bigger in people's leisure activities. With the rise of electronic sport games, a user need immediately adjust a position of a control module of a game controller according to a playing habit of the user to make a game operation fluency better and a game software requirement, so that the user can win in a competition.

A Chinese mainland patent with patent number of 205886185 discloses a replaceable rocker cap of game controller. The replaceable rocker cap of game controller includes a rocker cap and a rocker base. Two opposite sides of an inside of the rocker cap have two protruding ribs, respectively. Another two opposite sides of the inside of the rocker cap have two buckling portions, respectively. A bottom of the rocker base has a circular locating groove. A middle of the rocker base has a locating pillar. Two opposite sides of the locating pillar have two guiding grooves with two inclination angles, respectively. Another two opposite sides of the locating pillar have two recesses.

However, the above-mentioned game controller adjusts a size of an operating rocker of the game controller, the control module of the game controller is a stationary type, the control module includes a direction key and the operating rocker, because operation habits of the users are different, the fixed direction key and a position of the operating rocker are unnecessarily appropriate for the user. As a result, a hand feeling of operating the game controller is affected.

Thus, it is essential to provide an innovative replaceable control module applied in an innovative game controller which is different from the above-mentioned game controller, and the innovative game controller includes the innovative replaceable control module.

SUMMARY OF THE INVENTION

An object of the present invention is to provide a replaceable control module adapted for being applied in a game controller. The replaceable control module includes a base and an operation module. The base includes an upper cover, at least one buckling portion, at least one first elastic element, a driving rotation handle, at least one second elastic element and a cam assembly. A top surface of the upper cover has an assembling groove and a perforation. The assembling groove has a peripheral wall. The peripheral wall has at least one buckling groove. The at least one buckling portion is disposed to the upper cover. Each buckling portion has a locking hook. The locking hook penetrates through the at least one buckling groove and projects into the assembling groove. The at least one first elastic element is connected between the upper cover and the at least one buckling portion. The driving rotation handle is disposed in the upper cover. The driving rotation handle has an operation pole. The operation pole is disposed to and exposed to the perforation. The operation pole is disposed to and exposed to the perforation. The at least one second elastic element is connected between the upper cover and the driving rotation handle. The cam assembly is disposed between the at least one buckling portion and the driving rotation handle. The operation module is assembled in the assembling groove. One side surface of the operation module has at least one snapping groove. The locking hook of the at least one buckling portion is locked in the at least one snapping groove. When the operation pole rotates, the driving rotation handle drives the at least one buckling portion to move outward by virtue of the cam assembly so as to make the locking hook of the at least one buckling portion break away from the at least one snapping groove, when the operation pole is returned to an initial position, the at least one first elastic element and the at least one second elastic element drive the driving rotation handle and the at least one buckling portion to return to the initial position and an original position, respectively.

Another object of the present invention is to provide a replaceable control module mounted to the game controller. The replaceable control module includes an upper cover, at least one buckling portion, at least one first elastic element, a driving rotation handle, at least one second elastic element, a cam assembly, an operation module. A top surface of the upper cover is recessed downward to form an assembling groove. A front of the upper cover opens a perforation penetrating through a top wall of the accommodating groove and communicated with the accommodating groove. The assembling groove has a peripheral wall. The peripheral wall has at least one buckling groove. An inside of the upper cover has a location pillar. The at least one buckling portion is disposed to the upper cover. Each buckling portion has a locking hook. The locking hook penetrates through the at least one buckling groove and projects into the assembling groove. The at least one first elastic element is connected between the upper cover and the at least one buckling portion. The driving rotation handle is disposed in the upper cover. The driving rotation handle has an operation pole. The operation pole is disposed to and exposed to the perforation. A bottom of the operation pole extends sideward to form a sliding portion. The sliding portion opens the limiting groove. The location pillar is movably disposed in the limiting groove. A top surface of the operation pole protrudes upward to form an operation portion. The operation pole is disposed to and exposed to the perforation. The operation portion penetrates through the perforation and is exposed out of the upper cover. The at least one second elastic element is connected between the upper cover and the driving rotation handle. The cam assembly is disposed between the at least one buckling portion and the driving rotation handle. The operation module is assembled in the assembling groove. One side surface of the operation module has at least one snapping groove. The locking hook of the at least one buckling portion is locked in the at least one snapping groove. When the operation portion of the operation pole rotates, the driving rotation handle drives the at least one buckling portion to move outward by virtue of the cam assembly so as to make the locking hook of the at least one buckling portion break away from the at least one snapping groove, the location pillar abuts against one side wall of the limiting groove, when the operation portion of the operation pole is returned to an initial position, the at least one first elastic element and the at least one second elastic element drive the driving rotation handle and the at least one buckling portion to return to the initial position and an original position, respectively, the location pillar abuts against the other side wall of the limiting groove.

Another object of the present invention is to provide a game controller. The game controller includes a shell, and a replaceable control module mounted to the shell. The replaceable control module includes a base and an operation module. The base includes an upper cover, at least one buckling portion, at least one first elastic element, a driving rotation handle, at least one second elastic element and a cam assembly. A top surface of the upper cover has an assembling groove and a perforation. The assembling groove has a peripheral wall. The peripheral wall has at least one buckling groove. The at least one buckling portion is disposed to the upper cover. Each buckling portion has a locking hook. The locking hook penetrates through the at least one buckling groove and projects into the assembling groove. The at least one first elastic element is connected between the upper cover and the at least one buckling portion. The driving rotation handle is disposed in the upper cover. The driving rotation handle has an operation pole. The operation pole is disposed to and exposed to the perforation. A top surface of the operation pole protrudes upward to form an operation portion. The operation pole is disposed to and exposed to the perforation. The operation portion penetrates through the perforation and is exposed out of the upper cover. The at least one second elastic element is connected between the upper cover and the driving rotation handle. The cam assembly is disposed between the at least one buckling portion and the driving rotation handle. The operation module is assembled in the assembling groove. One side surface of the operation module has at least one snapping groove. The locking hook of the at least one buckling portion is locked in the at least one snapping groove. When the operation pole rotates, the driving rotation handle drives the at least one buckling portion to move outward by virtue of the cam assembly so as to make the locking hook of the at least one buckling portion break away from the at least one snapping groove, when the operation pole is returned to an initial position, the at least one first elastic element and the at least one second elastic element drive the driving rotation handle and the at least one buckling portion to return to the initial position and an original position, respectively.

As described above, when the operation module need be changed, a finger stirred the operation portion of the operation pole, the driving rotation handle rotates, each convex clasp of the driving rotation handle breaks away from a restricting groove of the upper cover, the driving cylinders of the plurality of the buckling portions are movably disposed in arc-shaped sliding grooves of the plurality of the cam grooves, each buckling portion and the at least one tension spring move outward along the distance and recede from the plurality of the snapping grooves, simultaneously, a plurality of spring pins in the assembling groove push the operation module to move upward to make the operation module break away and bounce up immediately, so the operation module is capable of being taken out from the assembling groove, when a force on the finger is relieved, the driving rotation handle is automatically rebounded to the initial position on account of function of at least one torsion spring, and at least one tension spring drives each buckling portion to return to the original position, at the moment, the driving cylinders of the plurality of the buckling portions are returned to the original positions, the operation module is placed in the assembling groove from top to bottom, the operation module pushes inclined surface of the locking hook, the at least one buckling portion and the at least one tension spring are pushed outward along the distance, the driving cylinders move a distance towards an outside of a line groove, when the locking hook is corresponding to a position of each snapping groove, the locking hook is locked in the snapping groove to realize locating and fixing the operation module with the base, the tension spring brings along each buckling portion to return to the original position, at the moment, the driving cylinders of the plurality of the buckling portions are returned to the original positions, at the same time, bare copper area contacts with the plurality of the spring pins of the circuit board to make the circuit breakover, a convex clasp of the driving rotation handle is buckled to the restricting groove of the bottom surface of the upper cover to make the driving rotation handle without rotating, so the replaceable control module is capable of being applied in a current game controller.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
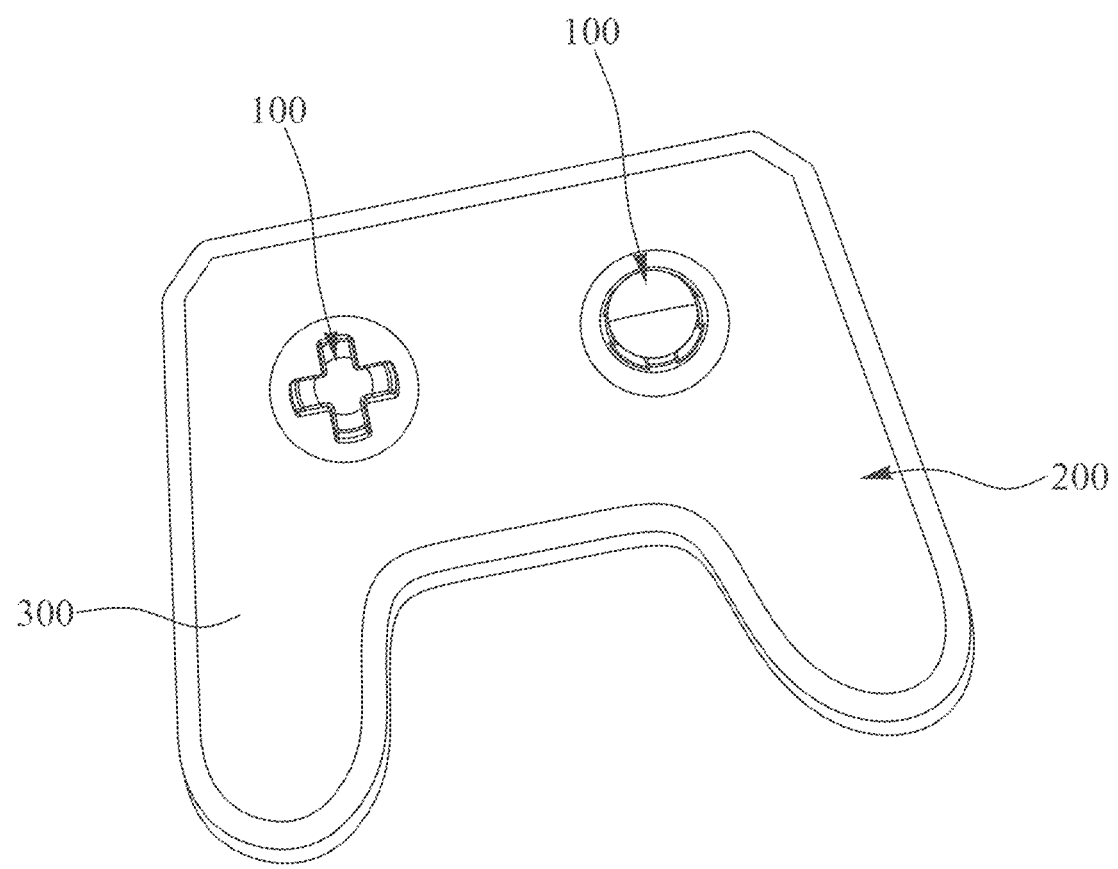
FIG. 1 is a perspective view of a game controller in accordance with a first preferred embodiment of the present invention.
Figure 2:
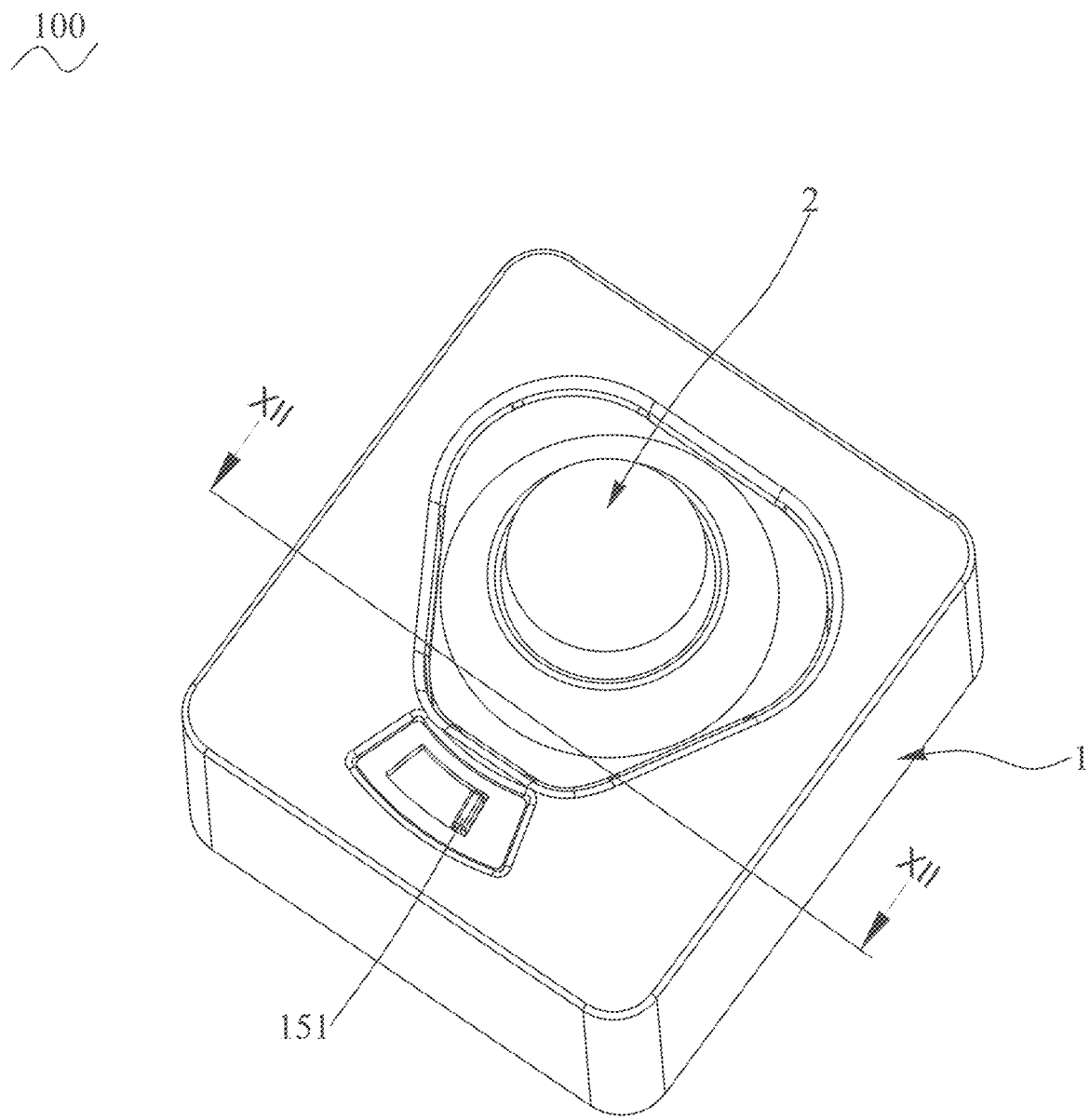
FIG. 2 is a perspective view of a replaceable control module applied in the game controller of FIG. 1.
Figure 3:
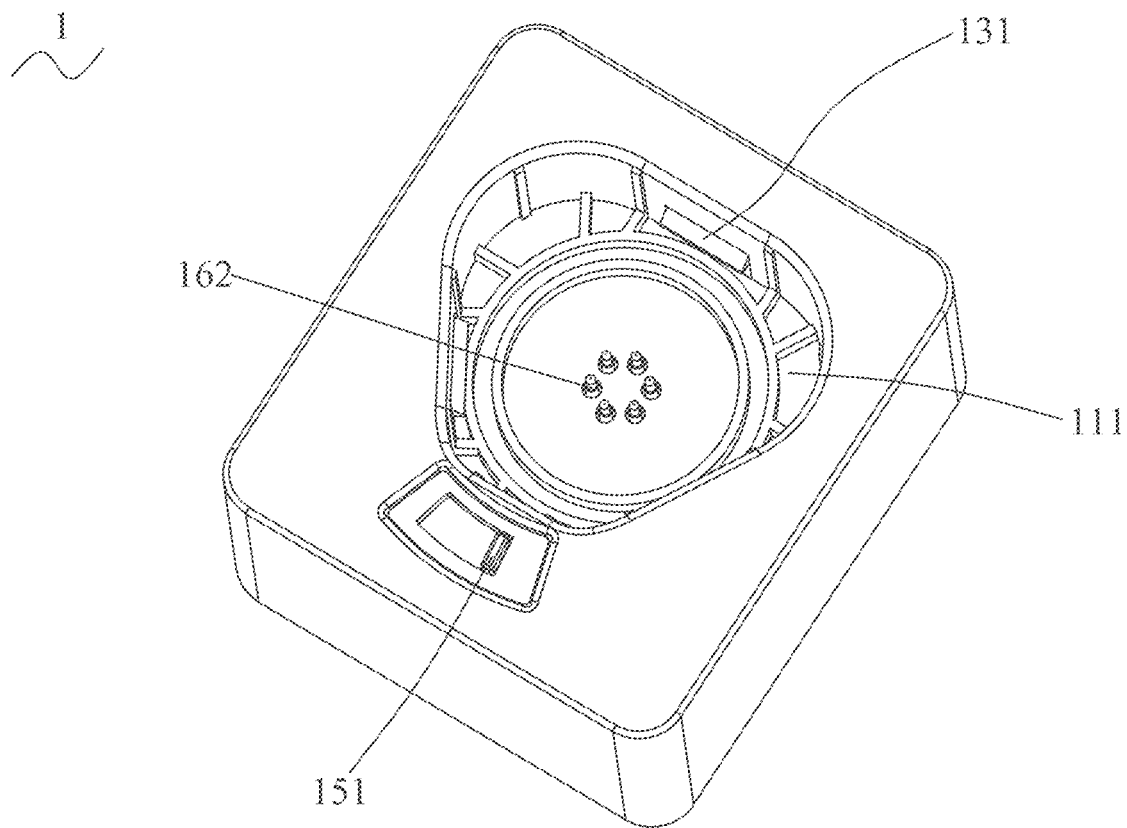
FIG. 3 is a perspective view of a base of the replaceable control module of FIG. 2.
Figure 4:
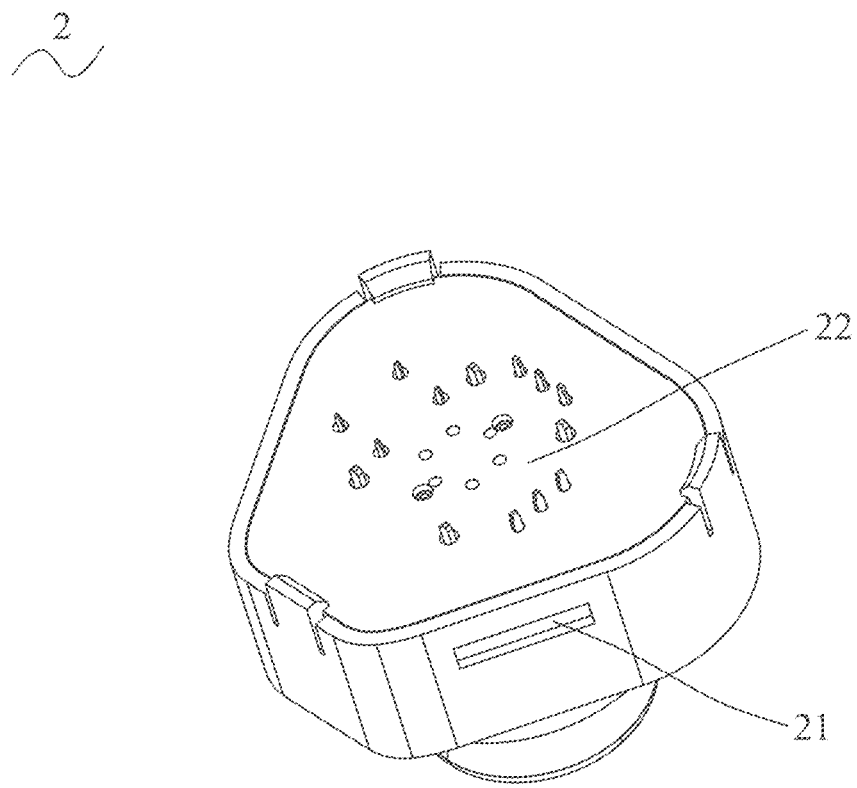
FIG. 4 is another perspective view of an operating module of the replaceable control module of FIG. 2.

With reference to FIG. 1 to FIG. 4, a replaceable control module 100 in accordance with a first preferred embodiment of the present invention is shown. The replaceable control module 100 is adapted for being applied in a game controller 200. The game controller 200 includes a shell 300, and the replaceable control module 100 mounted to the shell 300 of the game controller 200. The replaceable control module 100 includes a base 1 and an operation module 2. The operation module 2 is placed in the base 1 from top to bottom.

Figure 5:
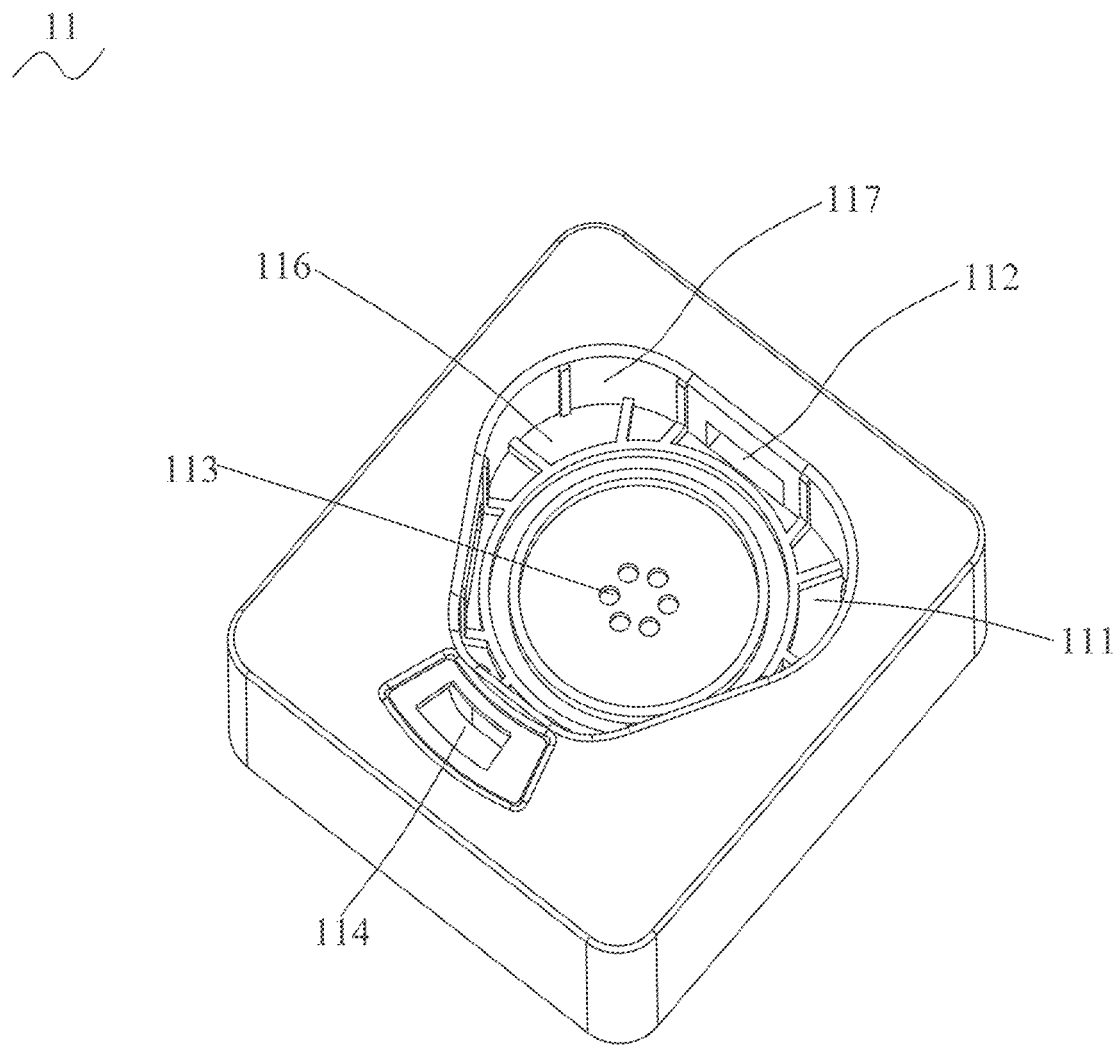
FIG. 5 is a perspective view of an upper cover of the base of the replaceable control module of FIG. 2.
Figure 6:
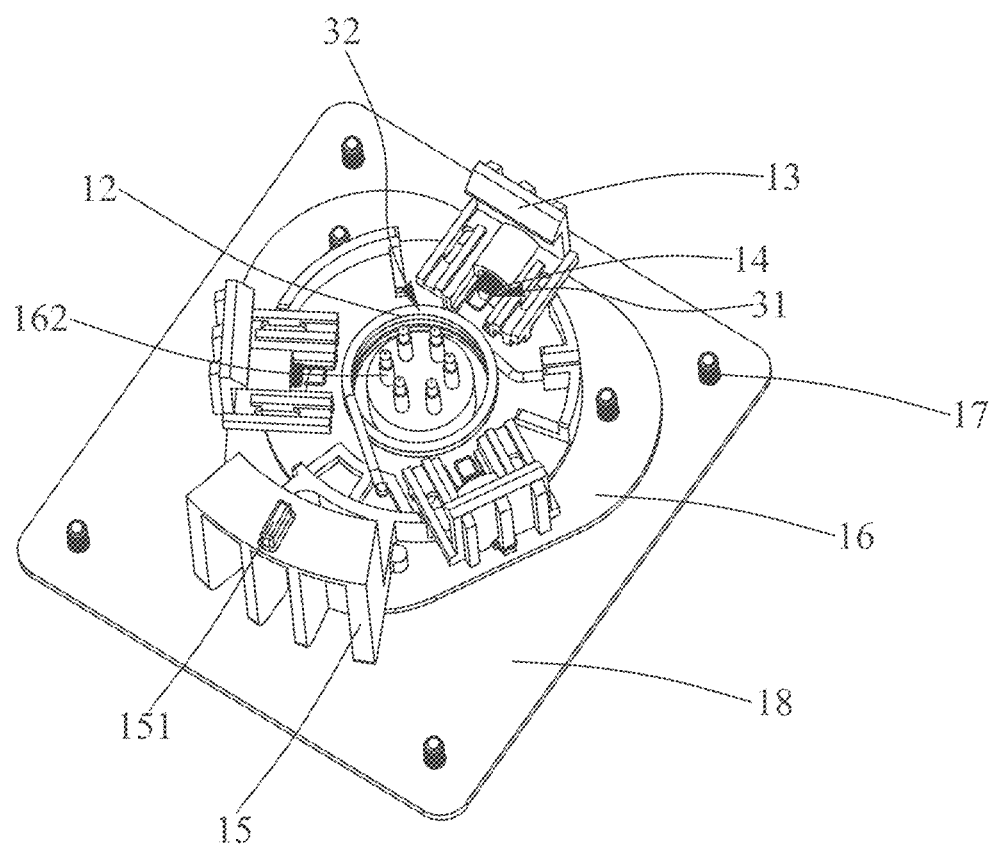
FIG. 6 is a partially perspective view of the base of the replaceable control module of FIG. 2.
Figure 7:
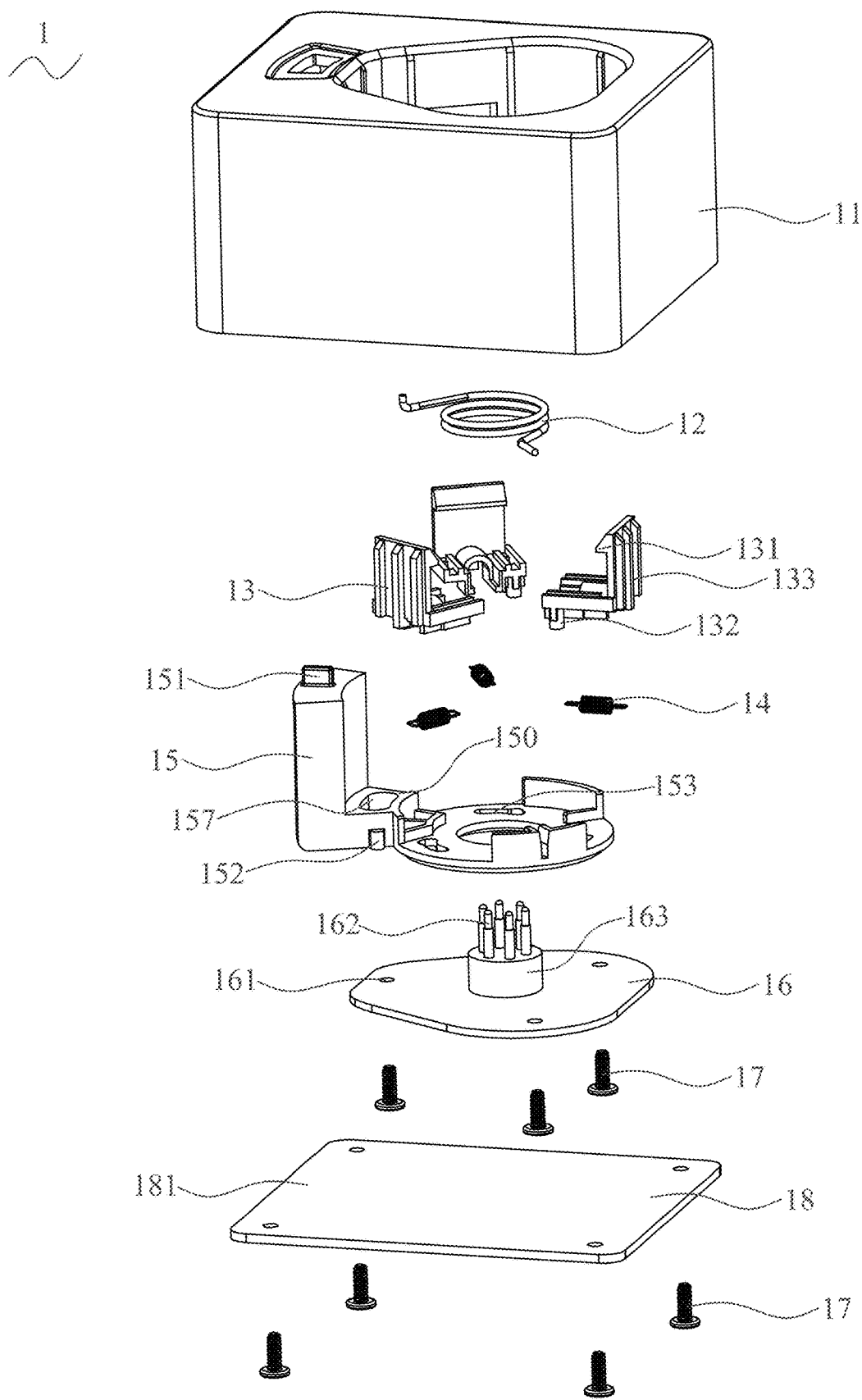
FIG. 7 is an exploded view of the base of the replaceable control module of FIG. 2.
Figure 8:
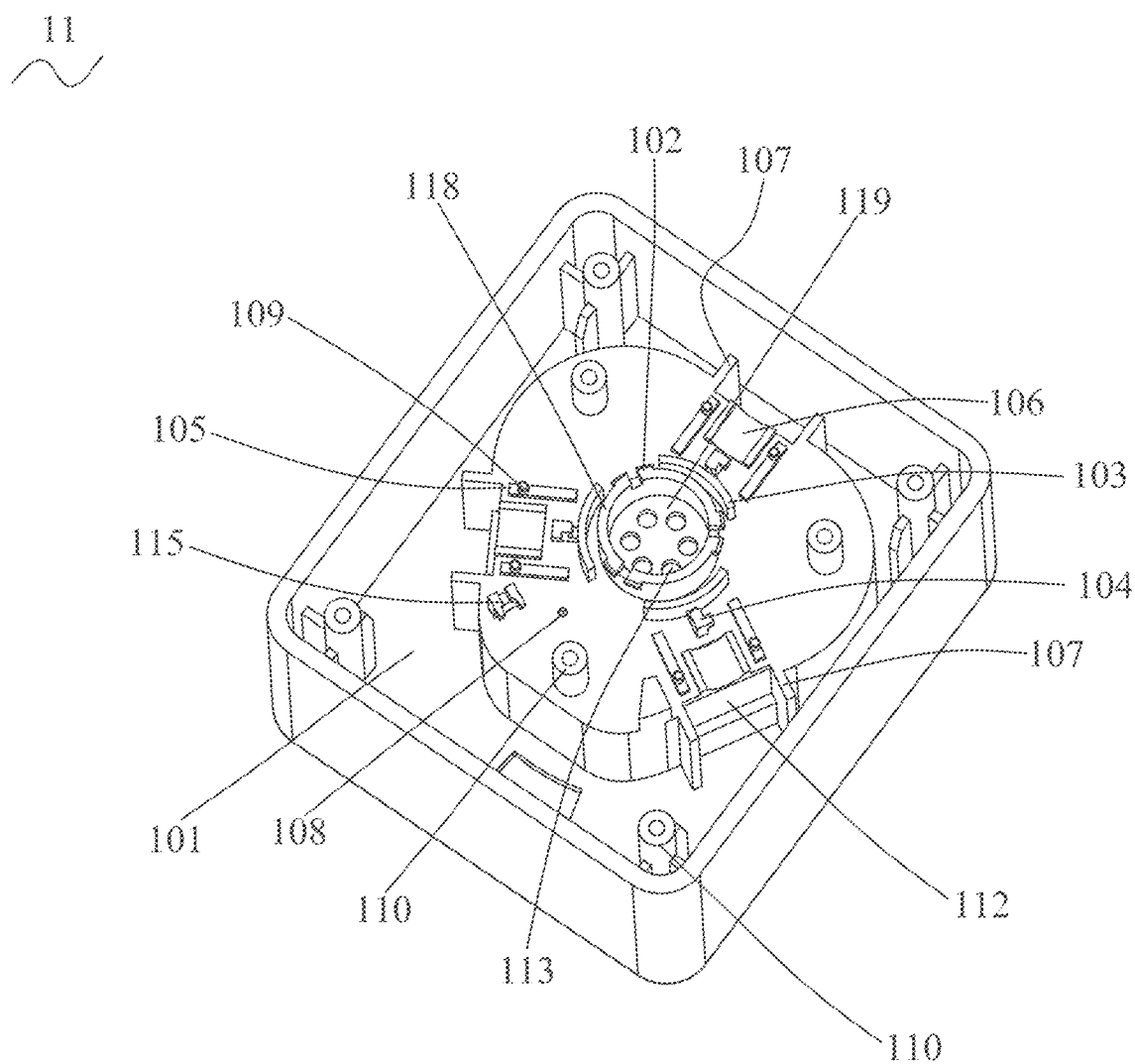
FIG. 8 is another perspective view of the upper cover of the base of the replaceable control module of FIG. 2.
Figure 9:
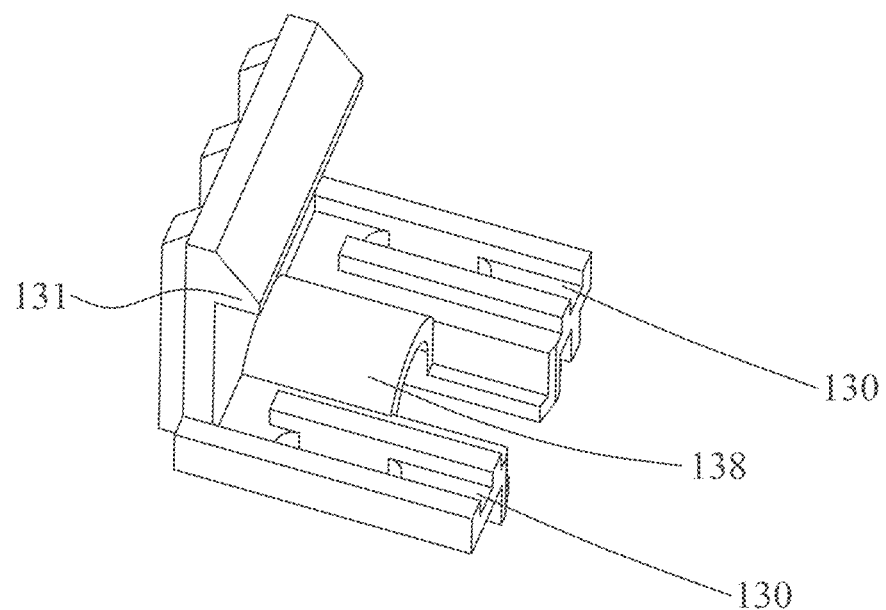
FIG. 9 is a perspective view of a buckling portion of the base of the replaceable control module of FIG. 2.
Figure 10:
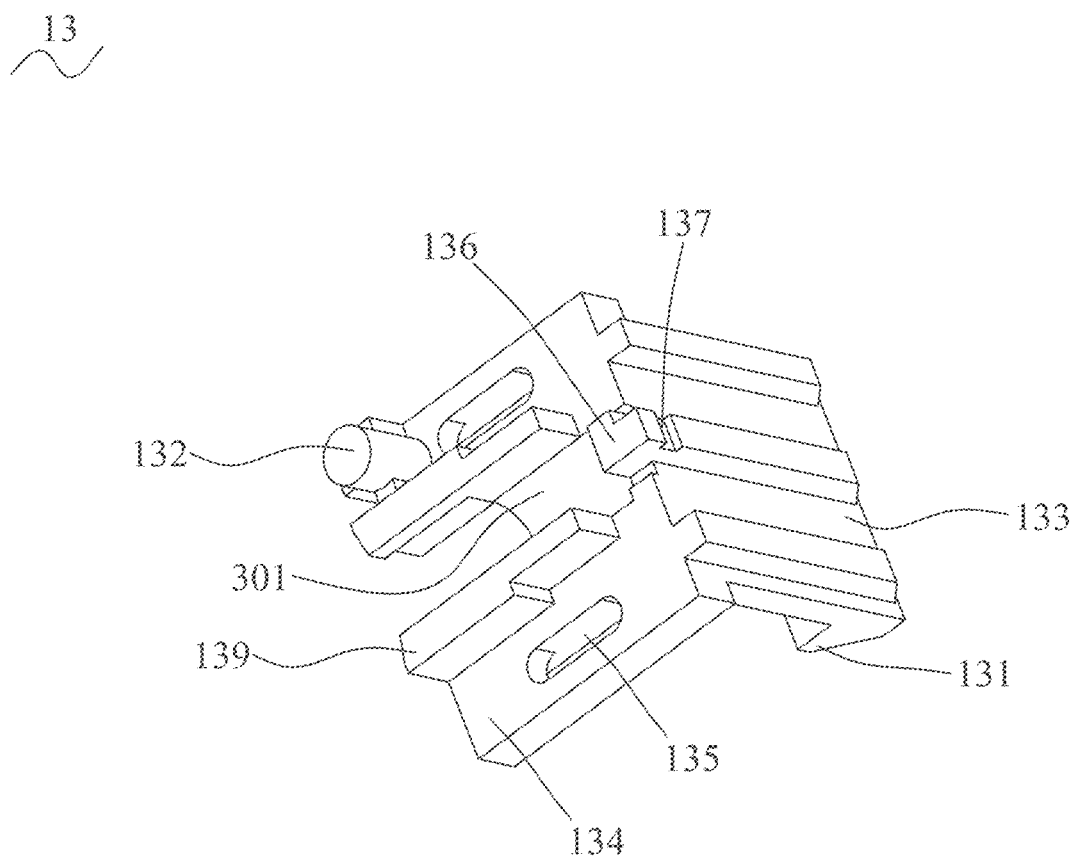
FIG. 10 is another perspective view of the buckling portion of the base of the replaceable control module of FIG. 2.

Referring to FIG. 5 to FIG. 7, the base 1 includes an upper cover 11, at least one torsion spring 12, at least one buckling portion 13, at least one tension spring 14, a driving rotation handle 15, a circuit board 16, a plurality of screws 17 and a lower cover 18. The at least one buckling portion 13 is disposed to the upper cover 11. The base 1 includes a plurality of buckling portions 13 and a plurality of tension springs 14. The base 1 includes at least one first elastic element 31 and at least one second elastic element 32. The at least one first elastic element 31 is the at least one tension spring 14. The at least one second elastic element 32 is the at least one torsion spring 12. The at least one torsion spring 12 is disposed to a top surface of the driving rotation handle 15.

The at least one torsion spring 12 is used for rebounding a position of the driving rotation handle 15. The at least one buckling portion 13 is located to the top surface of the driving rotation handle 15. The plurality of the buckling portions 13 are located to the top surface of the driving rotation handle 15. The driving rotation handle 15 is disposed in the upper cover 11. The at least one buckling portion 13 is used for fastening a corresponding mechanism of the operation module 2 to realize fixing and locating the base 1 with the operation module 2. The plurality of the buckling portions 13 are used for fastening corresponding mechanisms of the operation module 2 to realize locating and fixing the base 1 with the operation module 2. The at least one first elastic element 31 is disposed and connected between the upper cover 11 and the at least one buckling portion 13.

The at least one torsion spring 12 is disposed to an inner side of the at least one first elastic element 31. The at least one torsion spring 12 is disposed to inner sides of the plurality of the buckling portions 13. Each tension spring 14 is disposed under one buckling portion 13, and one end of each tension spring 14 hooks a corresponding mechanism of the one buckling portion 13. The other end of each tension spring 14 hooks a corresponding mechanism of the upper cover 11 to realize that each buckling portion 13 is pushed outward by one tension spring 14 to move a distance to return to an original position. The circuit board 16 is disposed to a bottom surface of the driving rotation handle 15. The circuit board 16 is used for making a circuit breakover at the time of the circuit board 16 contacting with the corresponding mechanism of the operation module 2. The lower cover 18 is disposed to a bottom surface of the circuit board 16. The plurality of the screws 17 are used for locking the circuit board 16 and the lower cover 18 under the upper cover 11.

Referring to FIG. 5 to FIG. 17, a top of the upper cover 11 has an assembling groove 111, at least one buckling groove 112, a plurality of openings 113 and a perforation 114. The perforation 114 is arched outward to show an arc shape. An inside of the upper cover 11 has an accommodating groove 101. The upper cover 11 opens the accommodating groove 101 penetrating through a bottom surface of the upper cover 11. A middle of a top surface of the upper cover 11 is recessed downward to form the assembling groove 111. The assembling groove 111 has a bottom wall 116, and a peripheral wall 117 connected with a periphery of the bottom wall 116. The peripheral wall 117 has the at least one buckling groove 112. Preferably, the peripheral wall 117 has a plurality of the buckling grooves 112. The assembling groove 111 is surrounded between an inner surface of the peripheral wall 117 and a top surface of the bottom wall 116. The bottom wall 116 is connected with a bottom of the peripheral wall 117. The plurality of the buckling grooves 112 penetrate through the peripheral wall 117 of the assembling groove 111. The plurality of the buckling grooves 112 are communicated with the accommodating groove 101. The plurality of the openings 113 penetrate through the bottom wall 116 of the assembling groove 111. A front of the upper cover 11 opens the perforation 114 penetrating through a top wall of the accommodating groove 101 and communicated with the accommodating groove 101.

The inside of the upper cover 11 further has a plurality of abutting portions 102, at least one first location piece 103, a fixing hole 108, a location pillar 110, a restricting groove 115 and a third location piece 118. Preferably, the inside of the upper cover 11 has a plurality of the location pillars 110. The inside of the upper cover 11 has a plurality of the first location pieces 103. The assembling groove 111 is used for receiving the operation module 2. The plurality of the buckling grooves 112 and the plurality of the openings 113 are located in the assembling groove 111. The perforation 114 is disposed to one side of the assembling groove 111. The plurality of the buckling grooves 112 penetrate through the peripheral wall 117 of the assembling groove 111. The plurality of the buckling grooves 112 are communicated between the assembling groove 111 and the accommodating groove 101.

A middle of a bottom surface of the bottom wall 116 of the assembling groove 111 extends downward to form the third location piece 118. The third location piece 118 surrounds a receiving groove 119 inside the third location piece 118. The plurality of the openings 113 are communicated with the receiving groove 119. The receiving groove 119 is used for receiving a corresponding mechanism of the circuit board 16. The third location piece 118 surrounds a loop to show an annular shape. Several portions of a bottom of the third location piece 118 extend outward to form the plurality of the abutting portions 102. The plurality of the abutting portions 102 are used for abutting against the driving rotation handle 15 to make the driving rotation handle 15 keep in a preset position.

Several portions of the bottom surface of the bottom wall 116 of the assembling groove 111 protrude downward to form the plurality of the first location pieces 103. Each first location piece 103 is arched outward to show a bow shape. The plurality of the first location pieces 103 are disposed around an outer periphery of the third location piece 118. A space 201 is formed between the third location piece 118 and the plurality of the first location pieces 103. The at least one torsion spring 12 is disposed in the space 201 between the third location piece 118 and the plurality of the first location pieces 103. A middle portion of the at least one torsion spring 12 is disposed in the space 201 and disposed between the third location piece 118 and the at least one first location piece 103.

The upper cover 11 has a location block 104. Preferably, several portions of the bottom surface of the bottom wall 116 of the assembling groove 111 protrude downward and slantwise extend sideward to form a plurality of L-shaped location blocks 104 seen from a bottom view. Each location block 104 is located to an outer side of one first location piece 103. The other end of each tension spring 14 hooks the location block 104. The upper cover 11 has a plurality of ribs 105 protruded downward from the bottom surface of the bottom wall 116 of the assembling groove 111. Each location block 104 is located between and spaced from two parallel ribs 105. The plurality of the ribs 105 are used to be buckled with corresponding mechanisms of the plurality of the buckling portions 13 to realize locating and fixing the upper cover 11 with the plurality of the buckling portions 13.

A bottom surface of each rib 105 protrudes downward to form a circular column 109. The circular columns 109 of the plurality of the ribs 105 are disposed in the corresponding mechanisms of the plurality of the buckling portions 13 to limit a moving distance of the plurality of the buckling portions 13. The bottom surface of the bottom wall 116 of the assembling groove 111 has a plurality of concave surfaces 106. Each concave surface 106 is disposed between the two parallel ribs 105. The plurality of the concave surfaces 106 of the upper cover 11 are located adjacent to and spaced from outer sides of the plurality of the location blocks 104. The plurality of the concave surfaces 106 are used for fastening the corresponding mechanisms of the plurality of the buckling portions 13 to realize locating and fixing the upper cover 11 with the plurality of the buckling portions 13. Several portions of the peripheral wall 117 extend outward to form a plurality of second location pieces 107. Each two second location pieces 107 are corresponding to the two parallel ribs 105. Each buckling groove 112 is located between two second location pieces 107.

The plurality of the second location pieces 107 are used to limit a position of each buckling portion 13 so as to realize locating and fixing the upper cover 11 with the plurality of the buckling portions 13. A bottom surface of the bottom wall 116 of the assembling groove 111 of the upper cover 11 has the fixing hole 108. One end of the at least one torsion spring 12 is disposed in the fixing hole 108. The bottom surface of the bottom wall 116 of the assembling groove 111 of the upper cover 11 has a plurality of location pillars 110 protruded downward. The circuit board 16 and the lower cover 18 are fastened to positions of the plurality of the location pillars 110 by the plurality of the screws 17. The bottom surface of the bottom wall 116 of the assembling groove 111 of the upper cover 11 has a restricting groove 115. The restricting groove 115 is used for locking a corresponding mechanism of the driving rotation handle 15 to make the driving rotation handle 15 incapable of rotating. The at least one second elastic element 32 is disposed and connected between the upper cover 11 and the driving rotation handle 15.

In the preferred embodiment, a quantity of the plurality of the first location pieces 103 is corresponding to a quantity of the plurality of the location block 104. The quantity of the plurality of the first location pieces 103 is corresponding to a quantity of the plurality of the concave surface 106. The quantity of the plurality of the first location pieces 103 is corresponding to a quantity of the plurality of the buckling portions 13. A quantity of the plurality of the ribs 105 is corresponding to a quantity of the plurality of the second location pieces 107. The third location piece 118 is shown as a circular ring shape. The plurality of the first location pieces 103 are averagely distributed around an outer periphery of the third location piece 118. Each first location piece 103 is disposed along a radial direction of the third location piece 118. The plurality of the location blocks 104 are averagely dispersed around outer sides of the plurality of the first location pieces 103, and each location block 104 is corresponding to one first location piece 103. Each location block 104 is disposed to the outer side of the one first location piece 103. Each location block 104 is disposed along the radial direction of the third location piece 118.

The plurality of the concave surfaces 106 are averagely dispersed around outer sides of the plurality of the location blocks 104, and each concave surface 106 is corresponding to one location block 104. Each concave surface 106 is disposed adjacent to and spaced from the outer side of the one location block 104. Each concave surface 106 is disposed along the radial direction of the third location piece 118. Each two ribs 105 are disposed as a pair. The plurality of the ribs 105 are disposed as a plurality of pairs of the ribs 105. The plurality of the pairs of the ribs 105 are averagely dispersed around the third location piece 118 and the plurality of the first location pieces 103. Each pair of the ribs 105 are disposed along the radial direction of the third location piece 118. Each location block 104 is located between one pair of the ribs 105. Each concave surface 106 is disposed between the one pair of the ribs 105. The concave surface 106 disposed between the one pair of the ribs 105 is located adjacent to and spaced from the outer side of the location block 104 located between the one pair of the ribs 105.

Each two second location pieces 107 are disposed as a pair, so the plurality of the second location pieces 107 are disposed as a plurality of pairs. The plurality pairs of the second location pieces 107 are dispersed along the radial directions of the third location piece 118. Each pair of the second location pieces 107 is disposed to an outer side of one concave surface 106. A portion between each pair of the second location pieces 107 has one buckling groove 112. In the preferred embodiment, the replaceable control module 100 includes three first location pieces 103, three location blocks 104, three pairs of the ribs 105, namely six ribs 105, three concave surfaces 106, three pairs of the second location pieces 107, namely six second location pieces 107, three buckling grooves 112 and three buckling portions 13.

Referring to FIG. 9 to FIG. 17, each buckling portion 13 has at least two limiting portions 130, a locking hook 131, a driving cylinder 132 disposed to the buckling portion 13, a bottom board 134, a lateral board 133 connected with the bottom board 134, a plurality of limiting holes 135, a protruding block 136, a fastening groove 137, a convex surface 138 and a plurality of extending portions 139. So the at least one buckling portion 13 has the driving cylinder 132 disposed to the at least one buckling portion 13. In the preferred embodiment, each buckling portion 13 has two limiting portions 130. Two sides of a top surface of the bottom board 134 are concaved downward to form the two limiting portions 130. Each limiting portion 130 is used for buckling with one rib 105 to realize locating and fixing the upper cover 11 with the plurality of the buckling portions 13. A free end of the lateral board 133 protrudes inward to form the locking hook 131. The locking hook 131 is hooked in and penetrates through the at least one buckling groove 112, and the locking hook 131 projects into the assembling groove 111. The locking hook 131 is locked in the buckling groove 112. The locking hook 131 is locked to the corresponding mechanism of the operation module 2 to realize locating and fixing the base 1 with the operation module 2. One side of a bottom surface of the bottom board 134 protrudes downward to form the driving cylinder 132. So the driving cylinder 132 is disposed to the one side of the bottom surface of the bottom board 134. The driving cylinder 132 is disposed to the corresponding mechanism of the driving rotation handle 15. Each limiting portion 130 has a limiting hole 135. The limiting hole 135 is a through-hole. The operation module 2 is assembled in the assembling groove 111 of the base 1, the circular column 109 of each rib 105 is disposed in the limiting hole 135 of one limiting portion 130.

When the operation module 2 is placed in the base 1, the circular column 109 of each rib 105 is located at one end of the one limiting hole 135. When the operation module 2 is changed, the circular column 109 of each rib 105 is movable in the one limiting hole 135. An outer portion of the bottom surface of the bottom board 134 extends downward to form the protruding block 136. A portion between the lateral board 133 and the protruding block 136 is recessed inward to form a fastening groove 137. The one end of each tension spring 14 hooks a position of the fastening groove 137 to realize that the plurality of the buckling portions 13 is moved outward by the tension spring 14 and along a distance to return to original positions. The convex surface 138 is located among the at least two limiting portions 130. In the preferred embodiment, the convex surface 138 is located between the two limiting portions 130.

The convex surfaces 138 of the three buckling portions 13 are used for abutting against the three concave surfaces 106 of the upper cover 11 to realize locating and fixing the plurality of the buckling portions 13 with the upper cover 11. At least two portions of the bottom surface of the bottom board 134 extend downward to form at least two extending portions 139. In the preferred embodiment, two sides of the bottom surface of the bottom board 134 extend downward to form two extending portions 139. The two extending portions 139 are located to a left side and a right side of the convex surface 138. Two portions of the bottom surface of the bottom board 134 extend downward to form two extending portions 139. A gap 301 is formed among the two extending portions 139 and the convex surface 138 of each limiting portion 130. The gap 301 of each limiting portion 130 is used for placing the one tension spring 14 therein. The two extending portions 139 are located to two sides of the one tension spring 14.

Figure 11:
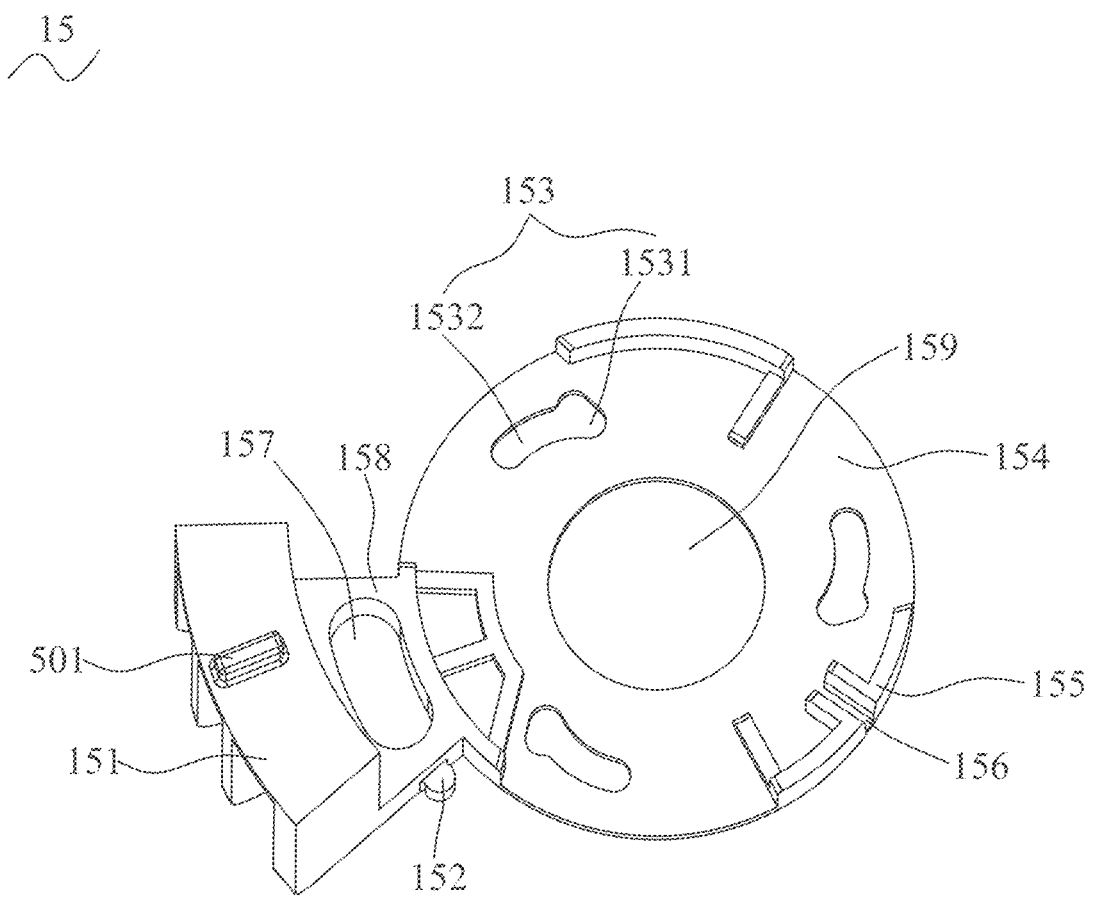
FIG. 11 is a perspective view of a driving rotation handle of the base of the replaceable control module of FIG. 2.
Figure 12:
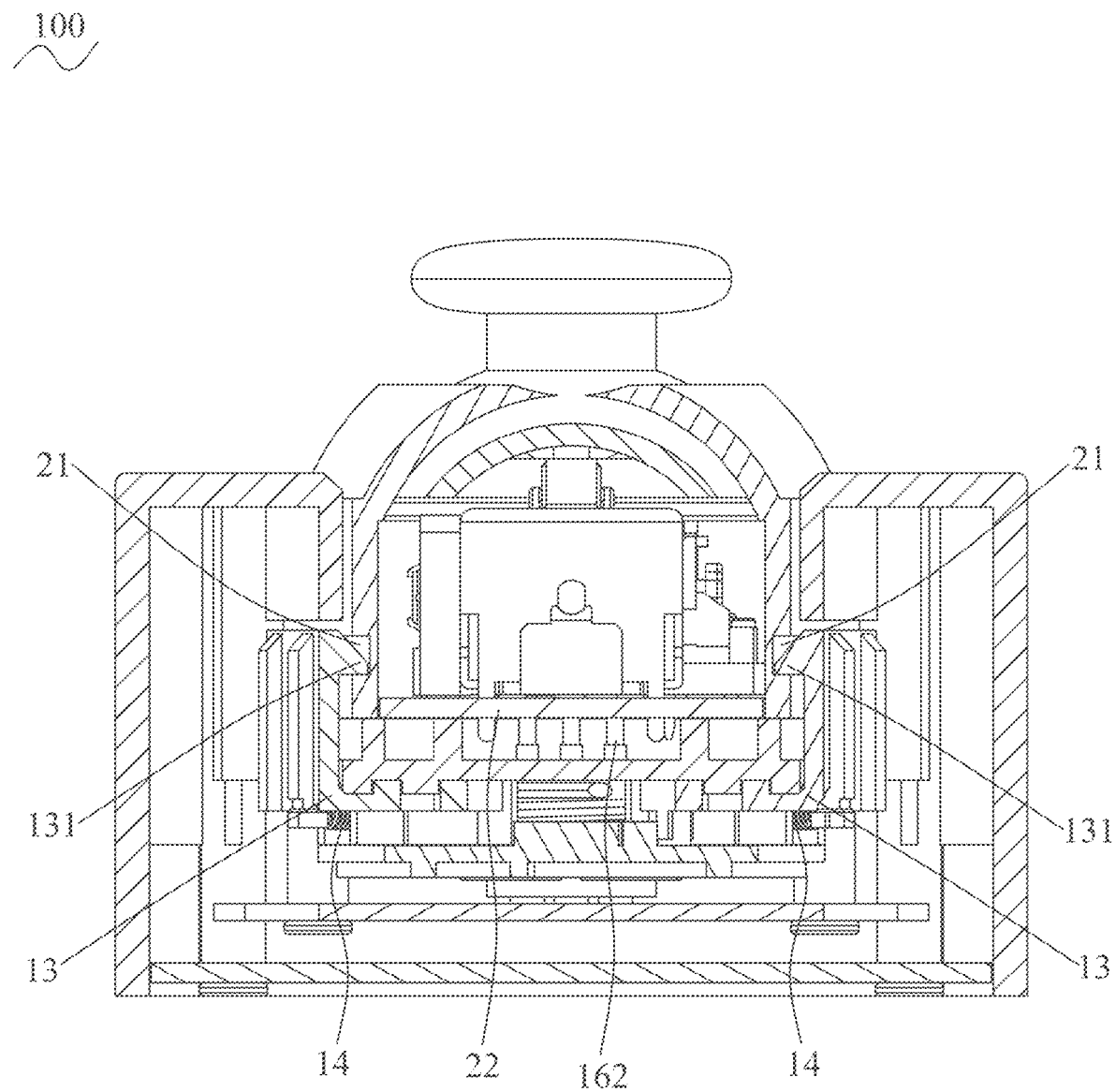
FIG. 12 is a sectional view of the replaceable control module along a line XII-XII of FIG. 2.
Figure 13:
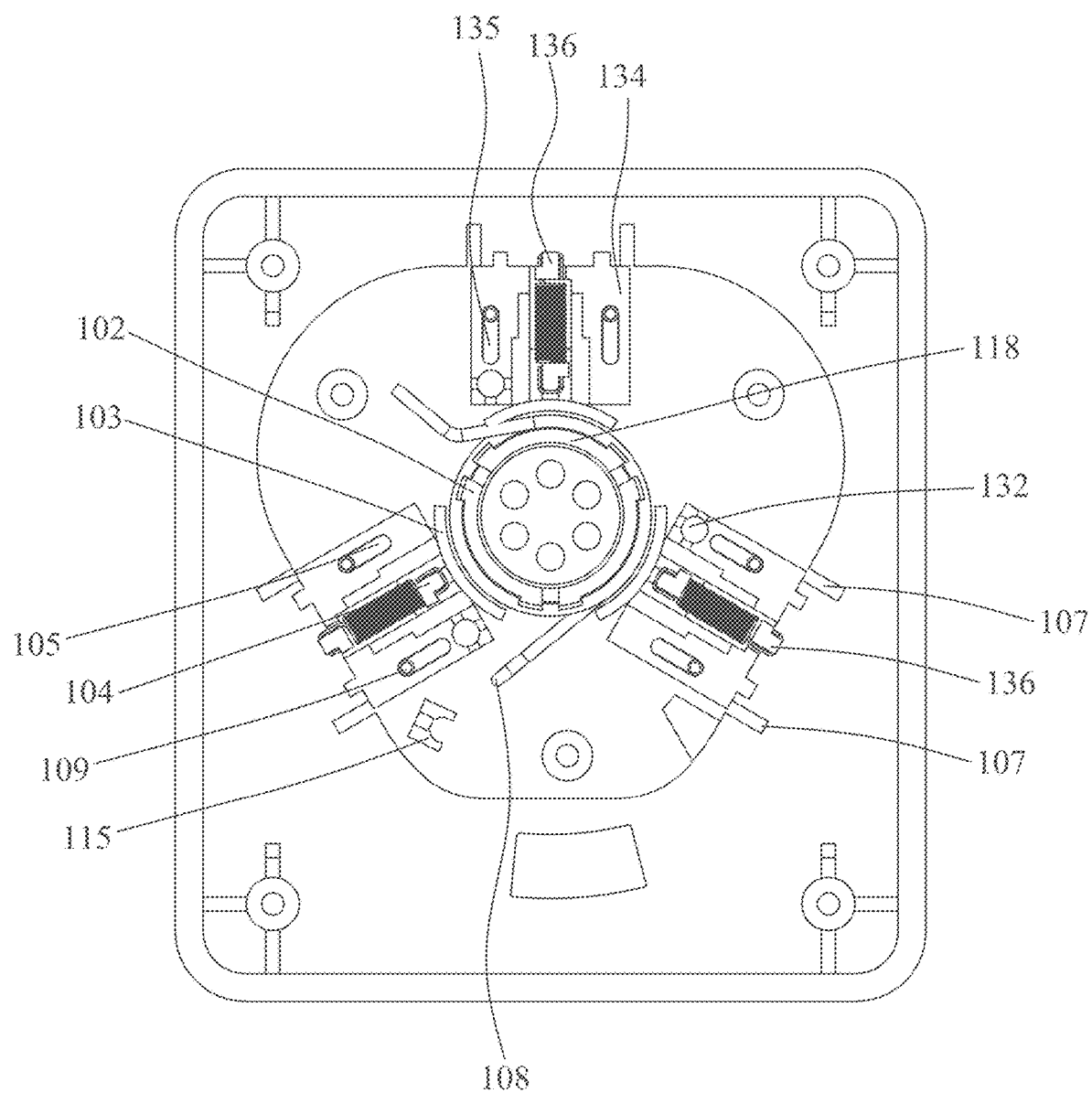
FIG. 13 is a diagrammatic drawing of a position of the buckling portion of the replaceable control module in accordance with the present invention.
Figure 14:
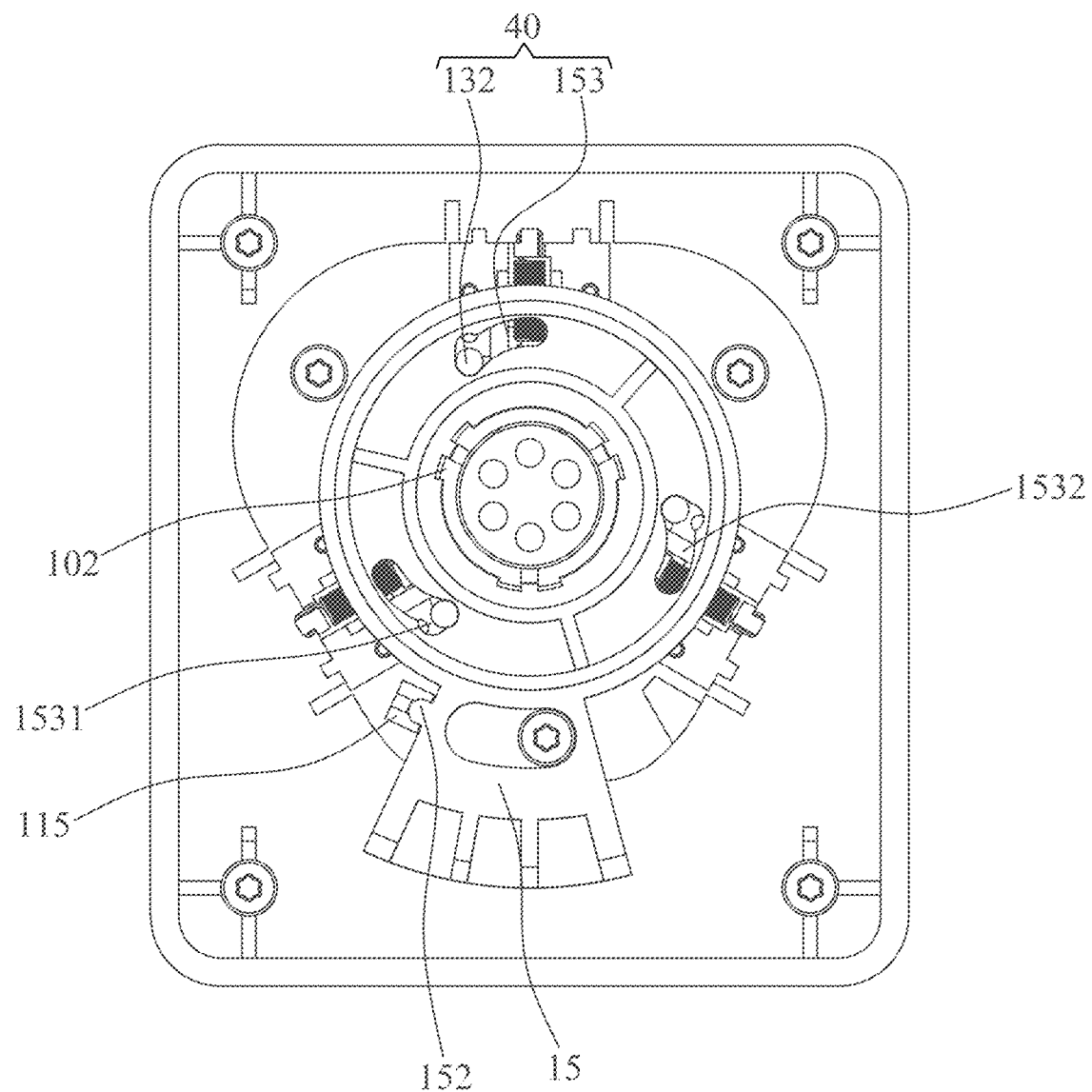
FIG. 14 is a diagrammatic drawing of a position of the driving rotation handle of the replaceable control module in accordance with the present invention.
Figure 15:
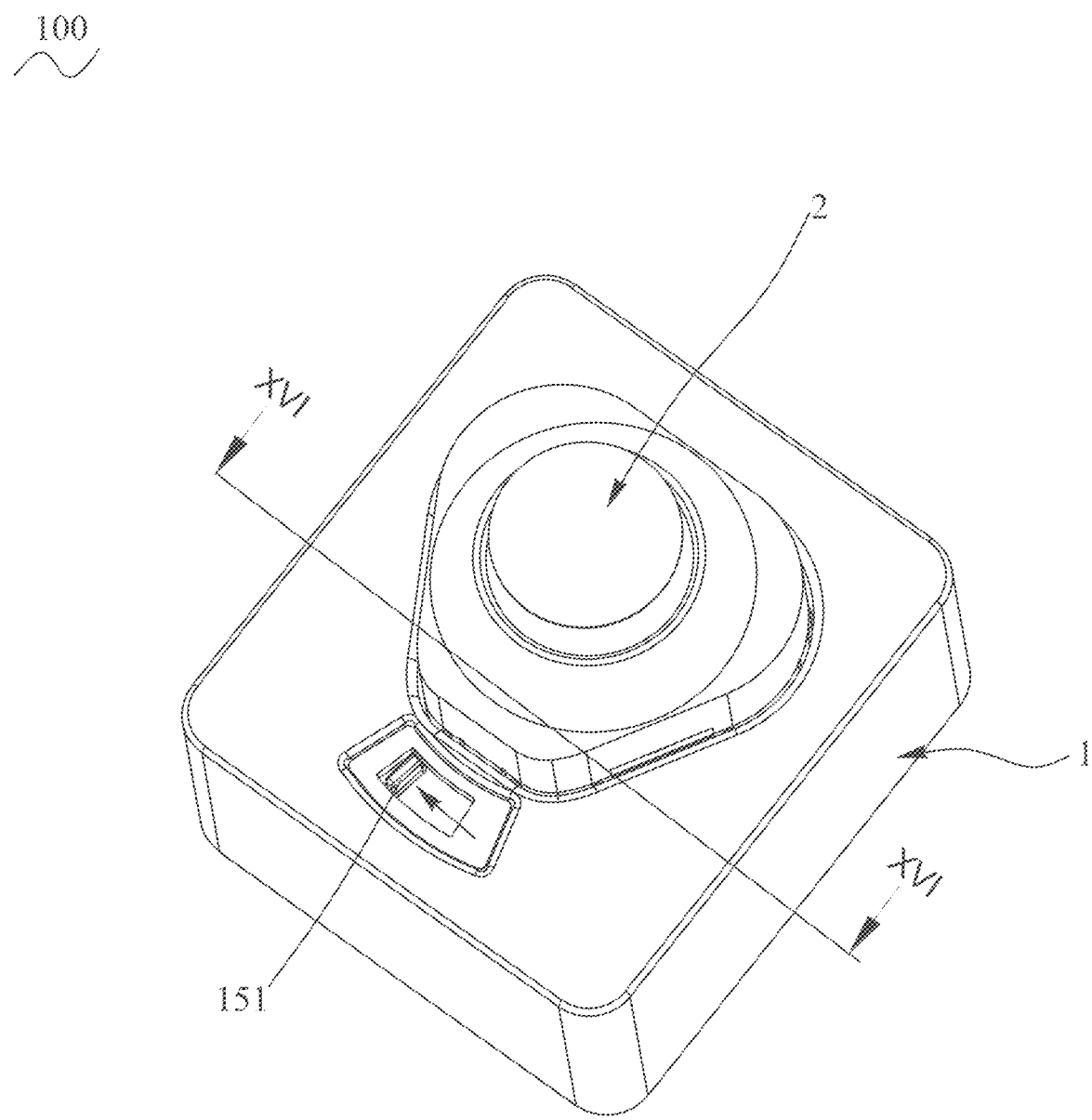
FIG. 15 is a diagrammatic drawing of a changeable operation module of the replaceable control module in accordance with the present invention.
Figure 16:
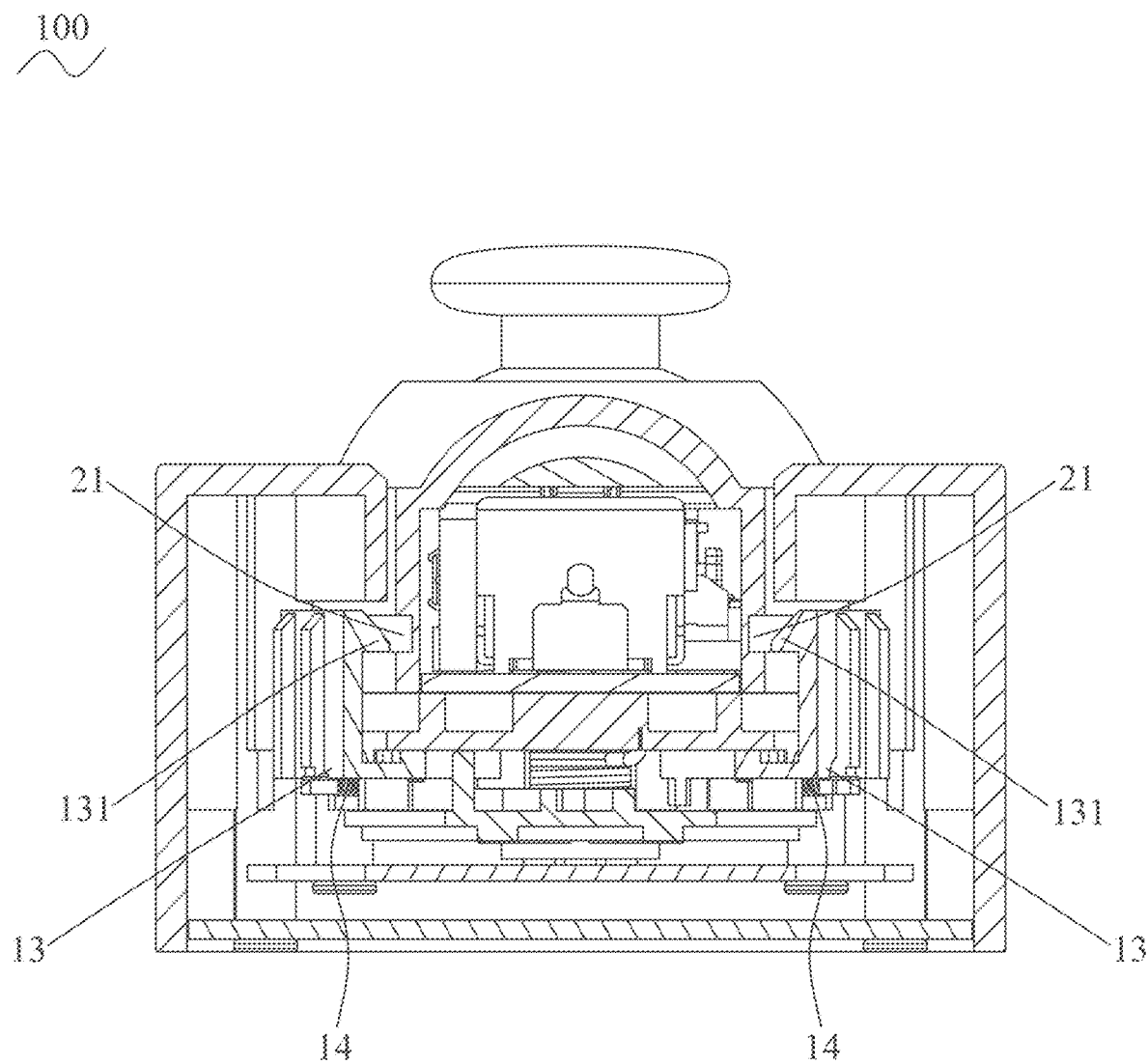
FIG. 16 is a sectional view of the replaceable control module along a line XVI-XVI of FIG. 15.
Figure 17:
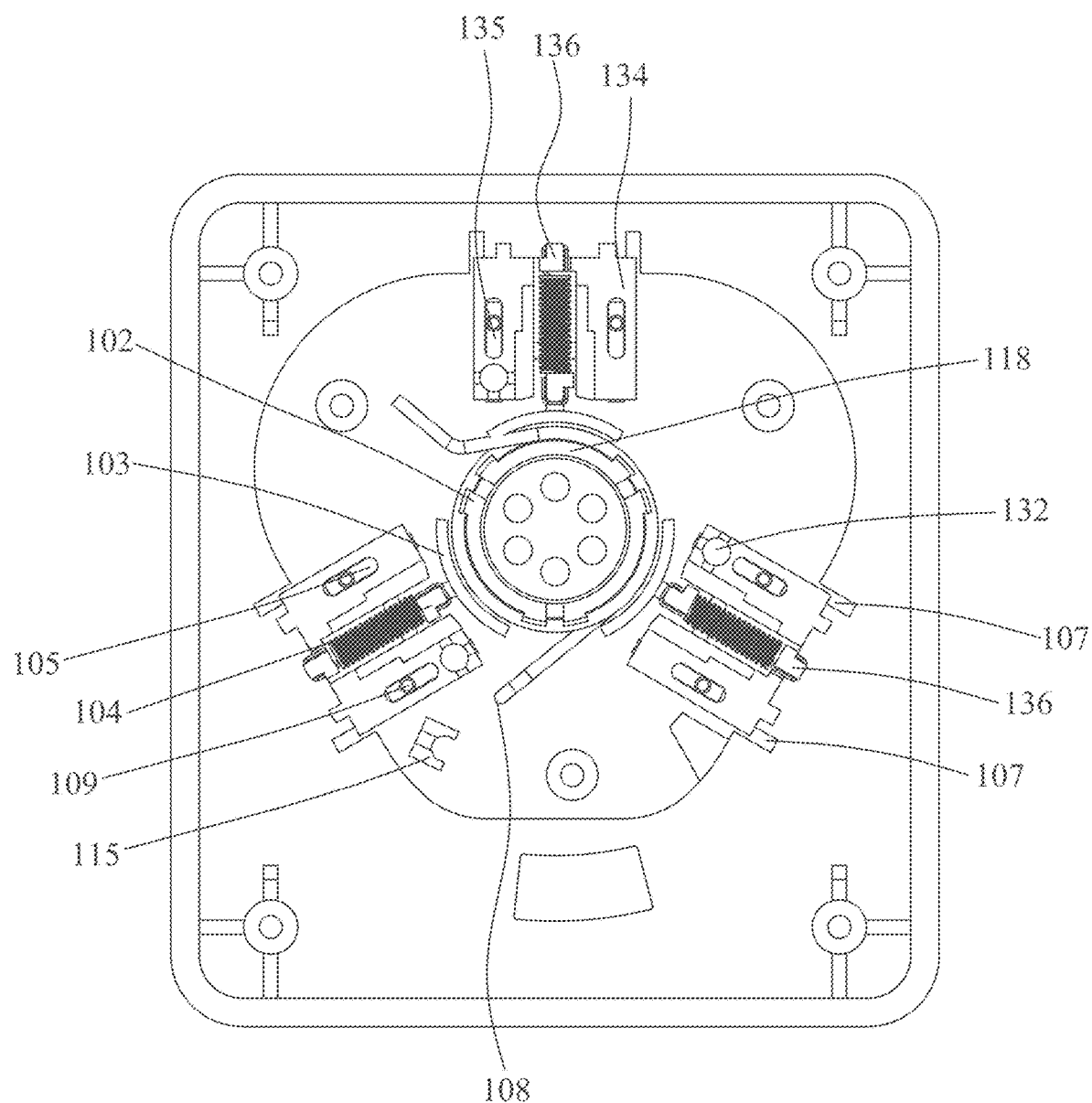
FIG. 17 is a diagrammatic drawing of the position of the buckling portion of the replaceable control module in accordance with the present invention.
Figure 18:
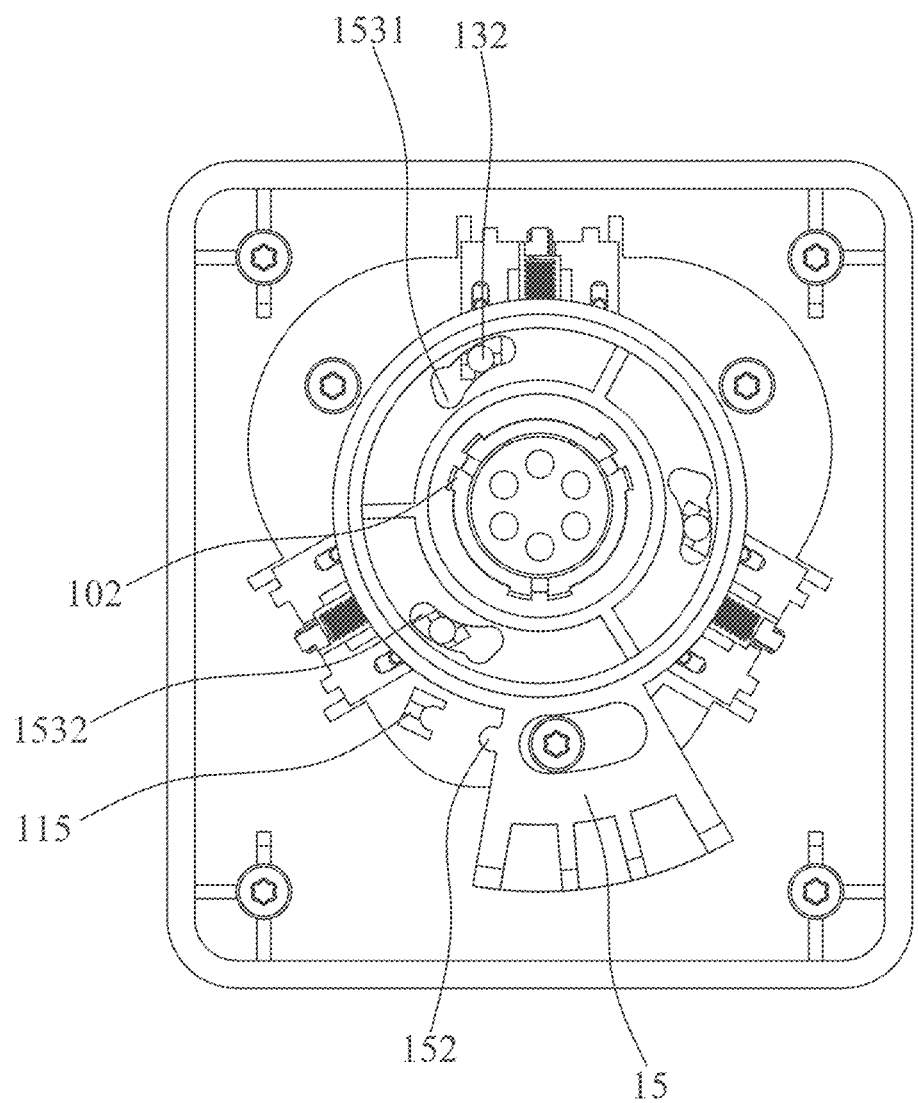
FIG. 18 is a diagrammatic drawing of the position of the driving rotation handle of the replaceable control module in accordance with the present invention.

Referring to FIG. 11, FIG. 13 and FIG. 14, the driving rotation handle 15 has an operation pole 151, a convex clasp 152, at least one cam groove 153 disposed in the driving rotation handle 15, a circular pad 154, a plurality of stopping portions 155, a crack 156, a limiting groove 157, a fastening portion 158 and a pivoting hole 159. A bottom of the operation pole 151 extends sideward to form a sliding portion 150. The sliding portion 150 is shown as a sector shape. The sliding portion 150 opens the limiting groove 157. A middle of the operation pole 151 is arched outward to show the arc shape. A middle of the limiting groove 157 is slightly curved outward. The operation pole 151 is substantially matched with the perforation 114. Preferably, a plurality of the cam grooves 153 are disposed in the driving rotation handle 15. Two opposite ends of the fastening portion 158 are connected with the circular pad 154 and the operation pole 151, respectively. The operation pole 151 projects beyond a top surface of the fastening portion 158. A middle of a top surface of the operation pole 151 protrudes upward to form an operation portion 501. The operation pole 151 is disposed to and exposed to the perforation 114. The operation portion 501 of the operation pole 151 penetrates through the perforation 114 and is exposed out of the upper cover 11. The operation pole 151 is used for operating and changing the operation module 2. One side of the fastening portion 158 has the convex clasp 152 protruded outward. The convex clasp 152 is restricted in or breaks away from the restricting groove 115 of the upper cover 11 to make the driving rotation handle 15 stop rotating or rotate. The convex clasp 152 is used for being restricted in the restricting groove 115 of the upper cover 11 to block the driving rotation handle 15 to make the driving rotation handle 15 stop rotating.

In the preferred embodiment, the convex clasp 152 is restricted in the restricting groove 115 of the upper cover 11. The circular pad 154 has the plurality of the cam grooves 153. The at least one cam groove 153 is disposed to the circular pad 154. The driving cylinders 132 of the at least two limiting portions 130 are disposed in the plurality of the cam grooves 153, respectively. The at least one cam groove 153 includes a line groove 1531 and an arc-shaped sliding groove 1532 communicated with each other. Each cam groove 153 includes the line groove 1531 and the arc-shaped sliding groove 1532 communicated with each other. When the operation module 2 is placed in the base 1, the plurality of the buckling portions 13 will move outward in the distance, and the driving cylinders 132 of the plurality of the buckling portions 13 slide in the line groove 1531, and the driving cylinders 132 of the plurality of the buckling portions 13 move from one end of the line groove 1531 to the other end of the line groove 1531 to generate the distance of the driving cylinders 132 of the plurality of the buckling portions 13 moving. When the driving cylinders 132 of the plurality of the buckling portions 13 are fastened, the driving cylinders 132 of the plurality of the buckling portions 13 will return to original positions.

When the operation module 2 is changed, the driving rotation handle 15 will rotate, at the moment, the driving cylinder 132 of the at least one buckling portion 13 moves in the arc-shaped sliding groove 1532 of the at least one cam groove 153, preferably, the driving cylinders 132 of the plurality of the buckling portions 13 will move in the arc-shaped sliding grooves 1532 of the plurality of the cam grooves 153, when the operation module 2 is completed being changed, the driving cylinders 132 of the plurality of the buckling portions 13 will return to the original positions. Several portions of an outer periphery of a top surface of the circular pad 154 protrude upward to form the plurality of the stopping portions 155. The plurality of the buckling portions 13 are disposed between the two stopping portions 155. One side of each buckling portion 13 is disposed adjacent to one side of one stopping portion 155. When the operation portion 501 of the operation pole 151 is moved towards a direction where an arrow points, the driving rotation handle 15 rotates, the plurality of the buckling portions 13 will move towards the other stopping portion 155 which is far away from the plurality of the buckling portions 13.

The one end of the at least one torsion spring 12 is located in the fixing hole 108. The crack 156 is disposed between the two stopping portions 155 for fastening the other end of the at least one torsion spring 12. The other end of the at least one torsion spring 12 is disposed in the crack 156. The torsion spring 12 is disposed between the crack 156 and the fixing hole 108. The limiting groove 157 is a through-hole.

The limiting groove 157 is formed in the fastening portion 158. The location pillar 110 passes through and is movably disposed in the limiting groove 157. When the operation module 2 is to be changed, the location pillar 110 abuts against one side wall of the limiting groove 157. When the operation module 2 is placed in the base 1, the location pillar 110 abuts against the other side wall of the limiting groove 157. The pivoting hole 159 is formed in a center portion of the circular pad 154. The plurality of the abutting portions 102 are buckled to an edge of the pivoting hole 159.

Referring to FIG. 6 and FIG. 7, the circuit board 16 has a plurality of first location holes 161, a plurality of spring pins 162 and a pivoting shaft 163. The pivoting shaft 163 is disposed to a top surface of the circuit board 16. A top of each spring pin 162 extends upward and projects beyond a top surface of the pivoting shaft 163. A bottom of each spring pin 162 is connected with the circuit board 16. The pivoting shaft 163 penetrates through the pivoting hole 159 and is received in the accommodating groove 101. The plurality of the spring pins 162 penetrate through the plurality of the openings 113. Tops of the plurality of the spring pins 162 are exposed in the assembling groove 111. When the plurality of the spring pins 162 contact with the corresponding mechanism of the operation module 2 to make a circuit breakover, the lower cover 18 has a plurality of second location holes 181. In the preferred embodiment, positions of the plurality of first location holes 161 are corresponding to positions of the plurality of the second location holes 181. The plurality of the screws 17 are locked in the plurality of the first location holes 161 and the plurality of the second location holes 181, respectively.

Referring to FIG. 4 to FIG. 7, one side surface of the operation module 2 has at least one snapping groove 21. The operation module 2 has a plurality of snapping grooves 21 and a bare copper area 22. Several portions of a peripheral surface of the operation module 2 are recessed inward to form the plurality of the snapping grooves 21. The at least one snapping groove 21 is corresponding to the locking hook 131 of the at least one buckling portion 13. Each snapping groove 21 is corresponding to the locking hook 131 of one buckling portion 13 to realize locating and fixing the operation module 2 with the base 1. A bottom surface of the operation module 2 has the bare copper area 22. When the bare copper area 22 is used for contacting with the plurality of the spring pins 162 of the circuit board 16 to make the circuit breakover, a shape of the operation module 2 is matched with the assembling groove 111 to make the operation module 2 received in the assembling groove 111. In practice, the operation module 2 is a rocker cap or a direction key cap. The operation module 2 is disposed in the assembling groove 111.

Referring to FIG. 2 to FIG. 14, in use, the operation module 2 is placed in the assembling groove 111 from top to bottom, an outer surface of the operation module 2 pushes an inclined surface of the locking hook 131 of each buckling portion 13. The at least one buckling portion 13 and the at least one tension spring 14 are pushed outward along the distance, the driving cylinders 132 of the plurality of the buckling portions 13 move the distance towards an outer side of the line groove 1531. When the locking hook 131 of the at least one buckling portion 13 is corresponding to the at least one snapping groove 21, the locking hook 131 of the at least one buckling portion 13 is locked in the at least one snapping groove 21 to realize locating and fixing the operation module 2 with the base 1. When the locking hook 131 of each buckling portion 13 is corresponding to a position of one snapping groove 21, the locking hook 131 of each buckling portion 13 is locked in the one snapping groove 21 to realize locating and fixing the operation module 2 with the base 1. The at least one tension spring 14 brings along each buckling portion 13 to return to the original position, at the moment, the driving cylinder 132 of each buckling portion 13 is returned to the original position. At the same time, the bare copper area 22 contact with the plurality of the spring pins 162 of the circuit board 16 to make the circuit breakover. The convex clasp 152 of the driving rotation handle 15 is buckled to the restricting groove 115 of the bottom surface of the upper cover 11 to make the driving rotation handle 15 without rotating. In practice, the plurality of the spring pins 162 of the circuit board 16 are capable of being replaced by connection terminals.

Referring to FIG. 15 to FIG. 18, when the operation module 2 need be changed, a finger stirred the operation portion 501 of the operation pole 151 towards the direction where the arrow pointed, the driving rotation handle 15 rotates, each convex clasp 152 of the driving rotation handle 15 breaks away from the restricting groove 115 of the upper cover 11. The driving cylinders 132 move in the arc-shaped sliding grooves 1532 of the plurality of the cam grooves 153. The at least one buckling portion 13 and the at least one tension spring 14 move outward along the distance and recede from the plurality of the snapping grooves 21. Simultaneously, the plurality of the spring pins 162 in the assembling groove 111 push the operation module 2 to move upward to make the operation module 2 break away from the upper cover 11 and bounce up immediately, so the operation module 2 is capable of being taken out from the assembling groove 111.

When a force on the finger is relieved, the driving rotation handle 15 is automatically rebounded to an initial position on account of a function of the at least one torsion spring 12. The at least one tension spring 14 drives each buckling portion 13 to return to the original position, at the moment, the driving cylinder 132 of each buckling portion 13 is returned to the original position. The driving cylinders 132 of the plurality of the buckling portions 13 and the plurality of the cam grooves 153 form a cam assembly 40 to make the driving rotation handle 15 bring along each buckling portion 13 to move outward at the time of the driving rotation handle 15 rotating. In practice, the at least one tension spring 14 and the at least one torsion spring 12 are capable of being replaced by the at least one first elastic element 31 which has the same function as function of the at least one tension spring 14 and the at least one second elastic element 32 which has the same function as function of the at least one torsion spring 12, respectively. The cam assembly 40 is disposed between the at least one buckling portion 13 and the driving rotation handle 15. Correspondingly, the cam assembly 40 includes the driving cylinder 132 disposed to the at least one buckling portion 13, and the at least one cam groove 153 disposed in the driving rotation handle 15. The driving cylinder 132 of the at least one buckling portion 13 is movably disposed in the at least one cam groove 153.

When the operation portion 501 of the operation pole 151 rotates, the driving rotation handle 15 drives the at least one buckling portion 13 to move outward by virtue of the cam assembly 40 so as to make the locking hook 131 of the at least one buckling portion 13 break away from the at least one snapping groove 21, the location pillar 110 abuts against the one side wall of the limiting groove 157, when the operation portion 501 of the operation pole 151 is returned to the initial position, the at least one first elastic element 31 and the at least one second elastic element 32 drive the driving rotation handle 15 and the at least one buckling portion 13 to return to the initial position and the original position, respectively, the location pillar 110 abuts against the other side wall of the limiting groove 157. Specifically, when the operation pole 151 rotates, the driving rotation handle 15 drives each buckling portion 13 to move outward by virtue of the cam assembly 40 so as to make the locking hook 131 of each buckling portion 13 break away from the snapping groove 21. When the operation pole 151 of the driving rotation handle 15 is returned to the initial position, the at least one first elastic element 31 and the at least one second elastic element 32 drive the driving rotation handle 15 and each buckling portion 13 to return to the initial position and the original position, respectively.

As described above, when the operation module 2 need be changed, the finger stirred the operation portion 501 of the operation pole 151, the driving rotation handle 15 rotates, each convex clasp 152 of the driving rotation handle 15 breaks away from the restricting groove 115 of the upper cover 11, the driving cylinders 132 of the plurality of the buckling portions 13 are movably disposed in the arc-shaped sliding grooves 1532 of the plurality of the cam grooves 153, the at least one buckling portion 13 and the at least one tension spring 14 move outward along the distance and recede from the plurality of the snapping grooves 21, simultaneously, the plurality of the spring pins 162 in the assembling groove 111 push the operation module 2 to move upward to make the operation module 2 break away and bounce up immediately, so the operation module 2 is capable of being taken out from the assembling groove 111, when the force on the finger is relieved, the driving rotation handle 15 is automatically rebounded to the initial position on account of the function of the at least one torsion spring 12, and the at least one tension spring 14 drives each buckling portion 13 to return to the original position, at the moment, the driving cylinders 132 of the plurality of the buckling portions 13 are returned to the original positions, the operation module 2 is placed in the assembling groove 111 from top to bottom, the operation module 2 pushes the inclined surface of the locking hook 131, the at least one buckling portion 13 and the at least one tension spring 14 are pushed outward along the distance, the driving cylinders 132 move the distance towards the outside of the line groove 1531, when the locking hook 131 is corresponding to the position of each snapping groove 21, the locking hook 131 is locked in the snapping groove 21 to realize locating and fixing the operation module 2 with the base 1, the tension spring 14 brings along each buckling portion 13 to return to the original position, at the moment, the driving cylinders 132 of the plurality of the buckling portions 13 are returned to the original positions, at the same time, the bare copper area 22 contacts with the plurality of the spring pins 162 of the circuit board 16 to make the circuit breakover, the convex clasp 152 of the driving rotation handle 15 is buckled to the restricting groove 115 of the bottom surface of the upper cover 11 to make the driving rotation handle 15 without rotating, so the replaceable control module 100 is capable of being applied in a current game controller.

What is claimed is:

1. A replaceable control module adapted for being applied in a game controller, comprising:
   a base, including
      an upper cover, a top surface of the upper cover having an assembling groove and a perforation, the assembling groove having a peripheral wall, the peripheral wall having at least one buckling groove,
      at least one buckling portion disposed to the upper cover, each buckling portion having a locking hook, the locking hook penetrating through the at least one buckling groove and projecting into the assembling groove,
      at least one first elastic element connected between the upper cover and the at least one buckling portion,
      a driving rotation handle disposed in the upper cover, the driving rotation handle having an operation pole, the operation pole being disposed to and exposed to the perforation,
      at least one second elastic element connected between the upper cover and the driving rotation handle,
      a cam assembly disposed between the at least one buckling portion and the driving rotation handle; and
   an operation module assembled in the assembling groove, one side surface of the operation module having at least one snapping groove, the locking hook of the at least one buckling portion being locked in the at least one snapping groove,
   wherein when the operation pole rotates, the driving rotation handle drives the at least one buckling portion to move outward by virtue of the cam assembly so as to make the locking hook of the at least one buckling portion break away from the at least one snapping groove, when the operation pole is returned to an initial position, the at least one first elastic element and the at least one second elastic element drive the driving rotation handle and the at least one buckling portion to return to the initial position and an original position, respectively.

2. The replaceable control module as claimed in claim 1, wherein the cam assembly includes a driving cylinder disposed to the at least one buckling portion, and at least one cam groove disposed in the driving rotation handle, the driving cylinder of the at least one buckling portion is movably disposed in the at least one cam groove.

3. The replaceable control module as claimed in claim 2, wherein each buckling portion has a bottom board, the driving cylinder is disposed to one side of a bottom surface of the bottom board, the driving rotation handle has a circular pad, the at least one cam groove is disposed to the circular pad, each cam groove includes a line groove and an arc-shaped sliding groove communicated with each other, the driving cylinder of the at least one buckling portion moves in the arc-shaped sliding groove of the at least one cam groove.

4. The replaceable control module as claimed in claim 1, wherein the at least one first elastic element is at least one tension spring, each buckling portion has a fastening groove, the upper cover has a location block, one end of each tension spring hooks the fastening groove, the other end of each tension spring hooks the location block.

5. The replaceable control module as claimed in claim 4, wherein each buckling portion has a bottom board, two sides of a bottom surface of a bottom board extend downward to form two extending portions, the two extending portions are located to two sides of the tension spring.

6. The replaceable control module as claimed in claim 5, wherein each buckling portion has a lateral board connected with the bottom board, the bottom board extends downward to form a protruding block, a portion between the lateral board and the protruding block is recessed inward to form the fastening groove.

7. The replaceable control module as claimed in claim 1, wherein the at least one second elastic element is at least one torsion spring, the upper cover has a fixing hole, the driving rotation handle has a crack, one end of the at least one torsion spring is disposed in the fixing hole, the other end of the at least one torsion spring is disposed in the crack.

8. The replaceable control module as claimed in claim 7, wherein the upper cover has at least one first location piece and a third location piece, a middle portion of the at least one torsion spring is disposed between the third location piece and the at least one first location piece.

9. The replaceable control module as claimed in claim 1, wherein the assembling groove has a bottom wall, and a peripheral wall connected with a periphery of the bottom wall, an inside of the upper cover has a location pillar, the driving rotation handle has a limiting groove, the location pillar is movably disposed in the limiting groove.

10. The replaceable control module as claimed in claim 9, wherein a bottom surface of the bottom wall of the assembling groove of the upper cover has a restricting groove, the driving rotation handle has a convex clasp, the convex clasp is restricted in or breaks away from the restricting groove to make the driving rotation handle stop rotating or rotate.

11. The replaceable control module as claimed in claim 1, wherein the perforation is arched outward to show an arc shape, a middle of the operation pole is arched outward to show the arc shape, the operation pole is substantially matched with the perforation.

12. A replaceable control module mounted to a game controller, comprising:
   an upper cover, a top surface of the upper cover being recessed downward to form an assembling groove, a front of the upper cover opening a perforation penetrating through a top wall of an accommodating groove and communicated with the accommodating groove, the assembling groove having a peripheral wall, the peripheral wall having at least one buckling groove, an inside of the upper cover having a location pillar;
   at least one buckling portion disposed to the upper cover, each buckling portion having a locking hook, the locking hook penetrating through the at least one buckling groove and projecting into the assembling groove;
   at least one first elastic element connected between the upper cover and the at least one buckling portion;
   a driving rotation handle disposed in the upper cover, the driving rotation handle having an operation pole, the operation pole being disposed to and exposed to the perforation, a bottom of the operation pole extending sideward to form a sliding portion, the sliding portion opening a limiting groove, the location pillar being movably disposed in the limiting groove, a top surface of the operation pole protruding upward to form an operation portion, the operation portion penetrating through the perforation and being exposed out of the upper cover;
   at least one second elastic element connected between the upper cover and the driving rotation handle;
   a cam assembly disposed between the at least one buckling portion and the driving rotation handle; and
   an operation module assembled in the assembling groove, one side surface of the operation module having at least one snapping groove, the locking hook of the at least one buckling portion being locked in the at least one snapping groove,
   wherein when the operation portion of the operation pole rotates, the driving rotation handle drives the at least one buckling portion to move outward by virtue of the cam assembly so as to make the locking hook of the at least one buckling portion break away from the at least one snapping groove, the location pillar abuts against one side wall of the limiting groove, when the operation portion of the operation pole is returned to an initial position, the at least one first elastic element and the at least one second elastic element drive the driving rotation handle and the at least one buckling portion to return to the initial position and an original position, respectively, the location pillar abuts against the other side wall of the limiting groove.

13. The replaceable control module as claimed in claim 12, wherein the perforation is arched outward to show an arc shape, a middle of the operation pole is arched outward to show the arc shape, the operation pole is substantially matched with the perforation.

14. The replaceable control module as claimed in claim 12, wherein the sliding portion is shown as a sector shape.

15. The replaceable control module as claimed in claim 12, wherein a middle of the limiting groove is slightly curved outward.

16. The replaceable control module as claimed in claim 12, wherein the cam assembly includes a driving cylinder disposed to the at least one buckling portion, and at least one cam groove disposed in the driving rotation handle, the driving cylinder of the at least one buckling portion is movably disposed in the at least one cam groove.

17. The replaceable control module as claimed in claim 16, wherein each buckling portion has a bottom board, the driving cylinder is disposed to one side of a bottom surface of the bottom board, the driving rotation handle has a circular pad, the at least one cam groove is disposed to the circular pad, each cam groove includes a line groove and an arc-shaped sliding groove communicated with each other, the driving cylinder of the at least one buckling portion moves in the arc-shaped sliding groove of the at least one cam groove.

18. A game controller, comprising:
   a shell; and
   a replaceable control module mounted to the shell, the replaceable control module including:
      a base, including
         an upper cover, a top surface of the upper cover having an assembling groove and a perforation, the assembling groove having a peripheral wall, the peripheral wall having at least one buckling groove,
         at least one buckling portion disposed to the upper cover, each buckling portion having a locking hook, the locking hook penetrating through the at least one buckling groove and projecting into the assembling groove,
         at least one first elastic element connected between the upper cover and the at least one buckling portion,
         a driving rotation handle disposed in the upper cover, the driving rotation handle having an operation pole, the operation pole being disposed to and exposed to the perforation, a top surface of the operation pole protruding upward to form an operation portion, the operation portion penetrating through the perforation and being exposed out of the upper cover,
         at least one second elastic element connected between the upper cover and the driving rotation handle,
         a cam assembly disposed between the at least one buckling portion and the driving rotation handle; and an operation module assembled in the assembling groove, one side surface of the operation module having at least one snapping groove, the locking hook of the at least one buckling portion being locked in the at least one snapping groove, wherein when the operation pole rotates, the driving rotation handle drives the at least one buckling portion to move outward by virtue of the cam assembly so as to make the locking hook of the at least one buckling portion break away from the at least one snapping groove, when the operation pole is returned to an initial position, the at least one first elastic element and the at least one second elastic element drive the driving rotation handle and the at least one buckling portion to return to the initial position and an original position, respectively.

* * * * *